Aug. 5, 1930.       C. H. YATES       1,772,173
GASKET OR JOINTING WASHER

Filed Jan. 5, 1928

Patented Aug. 5, 1930

1,772,173

UNITED STATES PATENT OFFICE

CHARLES HENRY YATES, OF BIRMINGHAM, ENGLAND

GASKET OR JOINTING WASHER.

Application filed January 5, 1928, Serial No. 244,704, and in Great Britain October 28, 1927.

This invention relates to gaskets or jointing washers such as are commonly used in making the joints between flanged pipe couplings and generally comprise a sheet of asbestos or the like having a covering sheet of thin metal on one or both sides.

Such gaskets or jointing washers are, of course, provided with a hole corresponding with the pipe and are in addition usually provided with two or more holes corresponding with the bolts or studs by which the flanges of the pipes are connected.

In practice it is found that for each standard size of pipe there are required many different designs of jointing washer or gasket owing to the fact that the pitch and diameter or spacing of the securing bolts or studs varies. This is particularly the case in connection with motor car work and garage managers find that they have to stock a very large variety of jointing washers or gaskets for each standard design of pipe.

The object of the present invention is to contsruct a gasket or jointing washer which can be used for many if not all cases of joints having the same pipe diameter.

A further object of the present invention is to improve the construction of the jointing washer or gasket in such manner that a better joint is effected.

According to the present invention openings for the bolts or studs are made in the jointing washer or gasket but these openings are made only partially through the thickness of the gasket and they are of larger area than the bolts or studs, the said openings leaving at least one sheet or thickness of material to be pierced by the user to suit the bolts or studs of the particular case to which he is going to apply the gasket or jointing washer.

In a gasket or jointing washer which is made of a sheet of asbestos or the like with a covering sheet of thin metal on each side the openings for the bolts or studs are made to penetrate one covering sheet and the asbestos, leaving the other covering sheet of thin metal unbroken. The user cuts holes in the unbroken covering sheet exactly to suit the position and diameter of the bolts or studs so that the gasket or washer is accurately positioned thereby.

The removal of portions of one covering sheet and of the asbestos at opposite sides of the pipe has the effect of enabling greater pressure to be concentrated around the pipe so that a better joint is effected than hitherto.

Referring to the drawings:—

Figure 1:
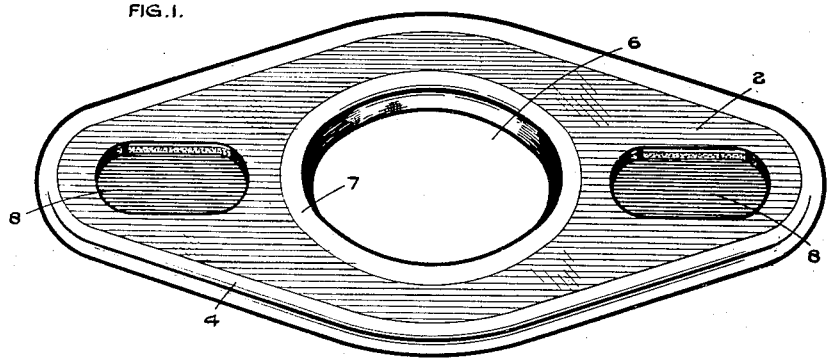
Figure 1 is a perspective view showing one form of the invention.
Figure 2:
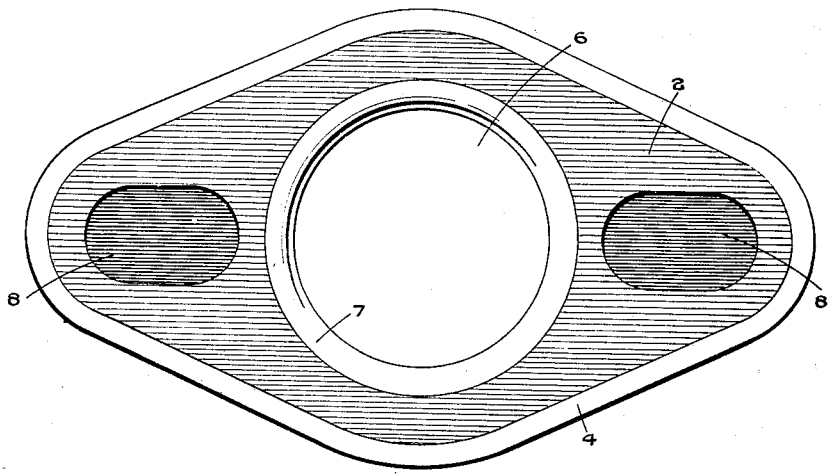
Figure 2 is a plan view.
Figure 3:
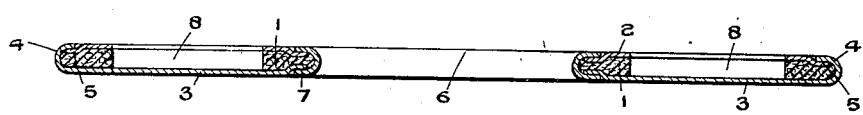
Figure 3 is a view in section.

In the construction illustrated the jointing washer or gasket consists of a sheet 1 of asbestos and covering sheets 2 and 3 of thin metal such as brass.

In the construction illustrated the edge 4 of the sheet 3 is bent over to embrace the edge 5 of the sheet 2 but this is not essential.

The gasket or washer is provided with a central hole 6 for the pipe and a ring 7 of thin copper or the like is placed in this hole and embraces the adjacent edges of the covering strips 2 and 3 and the asbestos 1, the arrangement being such that the thickness of the gasket or washer is constant throughout.

Openings 8 of slot form are made through the cover sheet 2 and the asbestos 1 but the cover sheet 3 remains unbroken.

The openings 8 are sufficiently large in width and length to provide for all known cases of variation in pitch and diameter of the bolts or studs.

When required for use the user pierces the holes in those portions of the cover sheet 3 which are opposite to the openings 8 these holes corresponding accurately in size and position with the bolts or securing studs so that the washer or gasket will be accurately positioned upon the bolts or studs.

What I claim then is:—

1. A jointing gasket adapted to be placed between a number of parts and comprising a body part having an opening adapted to form a communication through the gasket, the body also having a plurality of recesses located between said opening and the edge of the gasket, each recess extending only partially through the thickness of the gasket, the unpierced parts of said recesses being large enough to permit of any size of hole of a given range of sizes being formed therein when the gasket is being fitted in its operative position, and permitting of any selected spacing of the holes within predetermined limits being employed.

2. A jointing gasket adapted to be placed between a number of parts, the gasket comprising a non-metallic body, a metal sheathing, the gasket having an opening forming a communication through the gasket, the said body having apertures extending partially through it and closed at one end by the said metal sheathing, said apertures being located between said opening and the edge of the gasket, the parts of the said metal sheathing closing the said openings in the body of the gasket being large enough to permit of any size of hole of a given range of sizes being formed therein and permitting of any selected spacing of holes within predetermined limits being employed.

In witness whereof I affix my signature.

CHARLES HENRY YATES.